US011595235B2

(12) United States Patent
Palmer

(10) Patent No.: US 11,595,235 B2
(45) Date of Patent: *Feb. 28, 2023

(54) ADAPTIVE EQUALIZATION USING CORRELATION OF DATA PATTERNS WITH ERRORS

(71) Applicant: Rambus Inc., San Jose, CA (US)

(72) Inventor: Robert E. Palmer, Chapel Hill, NC (US)

(73) Assignee: Rambus Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/363,132

(22) Filed: Jun. 30, 2021

(65) Prior Publication Data

US 2021/0399929 A1     Dec. 23, 2021

Related U.S. Application Data

(63) Continuation of application No. 17/065,043, filed on Oct. 7, 2020, now Pat. No. 11,082,268, which is a
(Continued)

(51) Int. Cl.
*H04L 27/01*     (2006.01)
*H04L 7/04*     (2006.01)
(Continued)

(52) U.S. Cl.
CPC .............. *H04L 27/01* (2013.01); *H04L 7/041* (2013.01); *H04L 25/03006* (2013.01);
(Continued)

(58) Field of Classification Search
CPC ......... H04L 25/03; H04L 25/06; H04L 25/08; H04L 27/01
See application file for complete search history.

(56) References Cited

U.S. PATENT DOCUMENTS 4,187,479 A     2/1980    Ishizuka et al.
4,459,698 A     7/1984    Yumoto et al.
(Continued)

FOREIGN PATENT DOCUMENTS

WO    WO-2005-022750     3/2005

OTHER PUBLICATIONS

U.S. Appl. No. 60/572,951, filed May 21, 2004, Farjad-rad, Ramin.
(Continued)

*Primary Examiner* — Kevin Kim
(74) *Attorney, Agent, or Firm* — Silicon Edge Law Group LLP; Arthur J. Behiel

(57) ABSTRACT

An integrated receiver supports adaptive receive equalization. An incoming bit stream is sampled using edge and data clock signals derived from a reference clock signal. A phase detector determines whether the edge and data clock signals are in phase with the incoming data, while some clock recovery circuitry adjusts the edge and data clock signals as required to match their phases to the incoming data. The receiver employs the edge and data samples used to recover the edge and data clock signals to note the locations of zero crossings for one or more selected data patterns. The pattern or patterns may be selected from among those apt to produce the greatest timing error. Equalization settings may then be adjusted to align the zero crossings of the selected data patterns with the recovered edge clock signal.

19 Claims, 12 Drawing Sheets

Related U.S. Application Data continuation of application No. 16/734,148, filed on Jan. 3, 2020, now Pat. No. 10,826,733, which is a continuation of application No. 16/257,240, filed on Jan. 25, 2019, now Pat. No. 10,530,619, which is a continuation of application No. 15/889,273, filed on Feb. 6, 2018, now Pat. No. 10,212,008, which is a continuation of application No. 15/389,499, filed on Dec. 23, 2016, now Pat. No. 9,900,194, which is a continuation of application No. 14/702,966, filed on May 4, 2015, now Pat. No. 9,565,041, which is a continuation of application No. 14/159,597, filed on Jan. 21, 2014, now Pat. No. 9,054,906, which is a continuation of application No. 13/483,845, filed on May 30, 2012, now Pat. No. 8,665,940, which is a continuation of application No. 12/640,377, filed on Dec. 17, 2009, now Pat. No. 8,243,783, which is a continuation of application No. 11/414,289, filed on Apr. 27, 2006, now Pat. No. 7,639,737.

(51) Int. Cl.
*H04L 25/06* (2006.01)
*H04L 25/03* (2006.01)

(52) U.S. Cl.
CPC ...... *H04L 25/03273* (2013.01); *H04L 25/069* (2013.01); *H04L 7/046* (2013.01)

(56) References Cited

U.S. PATENT DOCUMENTS

| | | | |
|---|---|---|---|
| 4,639,681 A | 1/1987 | Hasegawa |
| 4,985,900 A | 1/1991 | Rhind et al. |
| 5,293,405 A | 3/1994 | Gersbach et al. |
| 5,384,551 A | 1/1995 | Kennedy et al. |
| 5,682,112 A | 10/1997 | Fukushima |
| 5,703,853 A | 12/1997 | Horigome et al. |
| 5,764,695 A | 6/1998 | Nagaraj et al. |
| 5,844,431 A | 12/1998 | Chen |
| 5,850,422 A | 12/1998 | Chen |
| 5,991,339 A | 11/1999 | Bazes et al. |
| 5,999,056 A | 12/1999 | Fong |
| 6,038,266 A | 3/2000 | Lee et al. |
| 6,192,071 B1 | 2/2001 | Hirth et al. |
| 6,225,795 B1 | 5/2001 | Stratakos et al. |
| 6,265,911 B1 | 7/2001 | Nairn |
| 6,266,379 B1 | 7/2001 | Dally |
| 6,282,690 B1 | 8/2001 | McClellan et al. |
| 6,329,874 B1 | 12/2001 | Ye et al. |
| 6,429,692 B1 | 8/2002 | Chan et al. |
| 6,438,187 B1 | 8/2002 | Abbey |
| 6,496,911 B1 | 12/2002 | Dixon et al. |
| 6,570,916 B1 | 5/2003 | Feldbaumer et al. |
| 6,580,768 B1 | 6/2003 | Jaquette |
| 6,624,688 B2 | 9/2003 | Jaussi et al. |
| 6,658,054 B1 | 12/2003 | Kuribayashi et al. |
| 6,717,995 B2 | 4/2004 | Zvonar |
| 6,731,683 B1 | 5/2004 | Fiedler et al. |
| 6,734,920 B2 | 5/2004 | Ghosh et al. |
| 6,812,872 B1 | 11/2004 | Lu |
| 6,992,855 B2 | 1/2006 | Ehrlich |
| 7,030,657 B2 | 4/2006 | Stojanovic et al. |
| 7,092,472 B2 | 8/2006 | Stojanovic |
| 7,126,378 B2 | 10/2006 | Stojanovic et al. |
| 7,173,993 B2 | 2/2007 | Engl et al. |
| 7,176,721 B2 | 2/2007 | Ho et al. |
| 7,194,025 B2 | 3/2007 | Wood et al. |
| 7,233,164 B2 | 6/2007 | Stojanovic et al. |
| 7,286,597 B2 | 10/2007 | Buchwald et al. |
| 7,310,397 B2 | 12/2007 | Smith et al. |
| 7,315,594 B2 | 1/2008 | Schmatz et al. |
| 7,315,596 B2 | 1/2008 | Payne et al. |
| 7,325,175 B2 | 1/2008 | Momtaz |
| 7,397,848 B2 | 7/2008 | Stojanovic et al. |
| 7,397,876 B2 | 7/2008 | Cranford, Jr. et al. |
| 7,400,675 B2 | 7/2008 | Moughabghab et al. |
| 7,406,135 B2 | 7/2008 | Cranford, Jr. et al. |
| 7,418,069 B2 | 8/2008 | Schmatz et al. |
| 7,496,161 B2 | 2/2009 | Chou et al. |
| 7,508,872 B2 | 3/2009 | Yamazaki |
| 7,555,091 B1 | 6/2009 | Lewicki et al. |
| 7,596,176 B2 | 9/2009 | Eleftheriou et al. |
| 7,639,736 B2 | 12/2009 | Farjad-rad |
| 7,715,471 B2 | 5/2010 | Werner et al. |
| 7,715,509 B2 | 5/2010 | Stojanovic et al. |
| 7,742,520 B2 | 6/2010 | Simpson et al. |
| 7,797,701 B1 | 9/2010 | Snow |
| 8,446,940 B2 | 5/2013 | Farjad-rad |
| 2002/0009167 A1 | 1/2002 | Farjad-Rad |
| 2002/0044618 A1 | 4/2002 | Buchwald et al. |
| 2004/0005001 A1 | 1/2004 | Jones et al. |
| 2004/0008059 A1 | 1/2004 | Chen et al. |
| 2004/0052309 A1 | 3/2004 | Li |
| 2004/0091028 A1 | 5/2004 | Aronson et al. |
| 2004/0190661 A1 | 9/2004 | Vrazel |
| 2004/0203559 A1 | 10/2004 | Stojanovic et al. |
| 2004/0252754 A1 | 12/2004 | Wood et al. |
| 2005/0047500 A1 | 3/2005 | Gupta et al. |
| 2005/0108600 A1 | 5/2005 | Arguelles |
| 2005/0180536 A1 | 8/2005 | Payne et al. |
| 2005/0238092 A1 | 10/2005 | Ng |
| 2005/0259726 A1 | 11/2005 | Farjad-rad |
| 2005/0271137 A1 | 12/2005 | Kolze et al. |
| 2005/0271169 A1 | 12/2005 | Momtaz et al. |
| 2006/0002497 A1 | 1/2006 | Zhang |
| 2006/0188043 A1 | 8/2006 | Zerbe et al. |
| 2006/0224339 A1 | 10/2006 | Kim et al. |
| 2006/0251195 A1 | 11/2006 | Chen et al. |
| 2006/0256892 A1 | 11/2006 | Momtaz |
| 2006/0280240 A1 | 12/2006 | Kikugawa et al. |
| 2007/0002942 A1 | 1/2007 | Simpson et al. |
| 2007/0064848 A1 | 3/2007 | Desai |
| 2007/0110148 A1 | 5/2007 | Momtaz et al. |
| 2007/0110199 A1 | 5/2007 | Momtaz et al. |
| 2007/0195874 A1 | 8/2007 | Aziz et al. |
| 2007/0253475 A1 | 11/2007 | Palmer |
| 2008/0037693 A1 | 2/2008 | Andrus et al. |
| 2008/0107165 A1 | 5/2008 | Nicolescu et al. |
| 2008/0112521 A1 | 5/2008 | Schmatz et al. |
| 2008/0247452 A1 | 10/2008 | Lee |
| 2008/0285695 A1 | 11/2008 | Cranford, Jr. et al. |
| 2009/0076939 A1 | 3/2009 | Berg et al. |
| 2009/0237138 A1 | 9/2009 | Shanbhag et al. |
| 2010/0008414 A1 | 1/2010 | Lee et al. |
| 2010/0027606 A1 | 2/2010 | Dai et al. |

OTHER PUBLICATIONS

Abramovitch, Danny "Lyapunov Redesign of Classical Digital Phase-Lock Loops" Communications and Optics Research Lab, Agilent Technologies, 22 pages, Jun. 5, 2003.

Abramovitch, Danny "Phase-Locked Loops: A Control Centric Tutortial" Communications and Optics Research Lab, Agilent Technologies, 50 pages, May 8, 2002.

Baker, Alan J, "An Adaptive Cable Equalizer for Serial Digital Video Rates to 400Mb/s." 1996 IEEE International Solid-State Circuits Conference, Session 10, Low-Power & Communication Signal Processing, Paper FA 10.7. 3 Pages.

Balan, Vishnu et al., "A 4.8-6.4-GB/s Serial Link for Backplane Applications Using Decision Feedback Equalization", 2005 IEEE Journal of Solid-State Circuits, vol. 40, No. 9, pp. 1957-1967, Sep. 2005, 11 Pages.

Brunn, Brian et al., "Edge-Equalization Extends Performance in Multi-Gigabit Serial Links" DesignCon 2005. 13 pages.

Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997. 3 pages.

Choi, Jong-Sang, et al. "A CMOS 3.5Gbps Continuous-time Adaptive Cable Equalizer with Joint Adaptation Method of Low-

(56) References Cited

OTHER PUBLICATIONS

Frequency Gain and High-Frequency Boosting." 2003 Symposium on VLSI Circuits Digest of Technical Paper. 4 Pages.

Dally et al., "Transmitter Equalization for 4-Gbps Signaling," IEEE Micro, vol. 17, No. 1, Jan./Feb. 1997, pp. 48-56. 9 pages.

Farjad-Rad et al., "0.622-8 Gbps 150mW Serial IO Macrocell with Fully Flexible Preemphasis and Equalization," Symposium on VLSI Circuits Digest of Technical Papers, Jun. 2003. 4 pages.

Farjad-Rad, Ramin re U.S. Appl. No. 12/615,824, filed Nov. 10, 2009, Office Action dated Aug. 25, 2010. 13 pages.

Farjad-Rad, Ramin, U.S. Appl. No. 12/543,983, filed Aug. 19, 2009, Response dated Mar. 8, 2011. 13 Pages.

Farjad-Rad, Ramin, U.S. Appl. No. 12/543,983, filed Aug. 19, 2009, re Response dated Sep. 7, 2010 to the Office Action dated May 5, 2010. 14 pages.

Farjad-Rad, Ramin, U.S. Appl. No. 12/543,983, filed Aug. 19, 2009 re Final Office Action dated Jan. 12, 2011. 7 Pages.

Farjad-Rad, Ramin, U.S. Appl. No. 12/543,983, filed Aug. 19, 2009, Office Action dated Feb. 6, 2012. 11 pages.

Farjad-Rad, Ramin, U.S. Appl. No. 12/615,824, filed Nov. 20, 2009, Office Action dated Feb. 15, 2011. 5 Pages.

Farjad-Rad, Ramin, U.S. Appl. No. 12/615,824, filed Nov. 20, 2009, Response dated Feb. 22, 2011 to the Office Action dated Feb. 15, 2011. 8 Pages.

Farjad-Rad, Ramin, U.S. Appl. No. 12/615,824, filed Nov. 20, 2009, Response dated Nov. 26, 2010 to the Office Action dated Aug. 25, 2010. 12 Pages.

Granberg, Tom, "Handbook of Digital Techniques for High-Speed Design." Prentice Hall Modern Semiconductor Design Series. Copyright 2004 by Pearson Education, Inc. 12 pages.

Harwood et al., "24.1: A 12.5Gb/s SerDes in 65nm CMOS Using a Baud-Rate ADC with Digital Receiver Equalization and Clock Recovery," Feb. 14, 2007, 2007 IEEE International Solid-State Circuits Conference, pp. 436-437, 613, 24.1.1-24.1.7. 10 pages.

Harwood et al., "A 12.5Gb/s SerDes in 65nm CMOS Using a Baud Rate ADC with Digital RX Equalization and Clock Recovery," Slideshow Presentation, 2007 IEEE International Solid-State Circuits Conference. 18 pages.

Kudoh, Yoshiharu. "A 0.13-um CMOS 5-GB/s 10-m 28 AWG Cable Transceiver with No-Feedback-Loop Continuous-Time Post-Equalizer." IEEE Journal of Solid-State Circuits, vol. 38., No. 5, May 2003. 6 Pages.

Madduri, Vansanta, "High Speed Backplanes in Communications Systems." Mar. 2004. 7 pages.

Meghelli et al., "4.1: A 10Gb/s 5-Tap-DFE/4-Tap-FFE Transceiver in 90nm CMOS," Feb. 6, 2006, 2006 IEEE International Solid-State Circuits Conference. 10 pages.

Napier, Tom, "Flash ADC takes the uncertainty out of high-speed data recovery," EDN Design Feature, Sep. 1, 1998, pp. 111-118. 5 pages.

Palmer, Robert E., U.S. Appl. No. 12/640,377, filed Dec. 17, 2009 re Information Disclosure Statement dated Feb. 11, 2010. 2 Pages.

Palmer, Robert re U.S. Appl. No. 12/640,377, filed Dec. 17, 2009 re Office Action dated Nov. 18, 2011. 8 Pages.

Palmer, Robert re U.S. Appl. No. 12/640,377, filed Dec. 17, 2009 re Response dated Apr. 17, 2012 to Office Action dated Nov. 18, 2011. 11 Pages.

Palmer, Robert re U.S. Appl. No. 12/640,377, filed Dec. 17, 2009, Amendment filed May 11, 2012 After Allowance in Response to the Notice of Allowance and Fee(s) Due dated May 1, 2012. 9 Pages.

Palmer, Robert re U.S. Appl. No. 12/640,377, filed Dec. 17, 2009, Notice of Allowance and Fee(s) Due dated May 1, 2012. 7 Pages.

Shakiba, Mohammad Hossein, "A 2.5Gb/s Adaptive Cable Equalizer." 1999 IEEE International Solid-State Circuits Conference, Session 23, Paper WP 23.3. 2 Pages.

Stojanovic et al., "Adaptive Equalization and Data Recovery in a Dual-Mode (PAM2/4) Serial Link Transceiver," Rambus, Inc. Department of Electrical Engineering, Stanford University, Jan. 2004. 4 pages.

Stojanovic, Vladimir et al. "Transmit Pre-Emphasis for High-Speed Time-Division-Multiplexed Serial Link Transceiver." Submitted to IEEE Symposium on VLSI Circuits, Jun. 2004. 17 pages.

Widmer et al., "Single-Chip 4 × 500-MBd CMOS Transceiver," IEEE Journal of Solid-State Circuits, vol. 31, No. 12, Dec. 1996, pp. 2004-2014. 11 pages.

Zerbe, et al., "Equalization and Clock Recovery for a 2.5-10 GB/s 2-PAM/4-PAM Backplane Transceiver Cell", Presented at ISSCC 2003, Session 4, Clock Recovery and Backplane Transceivers, Paper 4.6. 10 pages.

Zhang, Johnny et al. "White Paper on Transmit Pre-Emphasis and Receive Equalization." Oct. 31, 2002. 8 pages.

US 11,595,235 B2

ADAPTIVE EQUALIZATION USING CORRELATION OF DATA PATTERNS WITH ERRORS

FIELD OF THE INVENTION

The present invention relates generally to the field of communications, and more particularly to high-speed electronic signaling within and between integrated circuit devices.

BACKGROUND

Communication channels typically exhibit low pass filter effects that disproportionately attenuate high-frequency signal components. These effects can vary from one channel to the next, and can vary over time in a given channel. Adaptive receive equalization schemes are therefore used in high-speed communication links to compensate for all or part of the distortion imposed by the channel.

The amount of channel-induced distortion appearing on any particular bit in a serial data signal is pattern dependent. This pattern dependency owes to the fact that different data patterns have different spectral content, and are thus affected differently by the channel transfer function. As a first-order approximation for a typical channel, the higher the frequency, the greater the attenuation.

Equalization refers generally to processes for emphasizing or attenuating a selected frequency or frequencies of a signal, often to compensate for frequency-specific attenuation of the signal. Equalization schemes can be "adaptive," in which case the equalization parameters may be dynamically adjusted to account for variables that affect the communication channel, including process variations and fluctuations in temperature, supply voltage, and the noise environment. Many of these adaptive equalization schemes require sensitive analog circuitry and/or additional samplers that significantly increase system complexity, implementation difficulty, and power requirements. There is therefore a need for efficient adaptive receiver equalization systems and methods that are more easily implemented and verified, with reduced power penalty.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
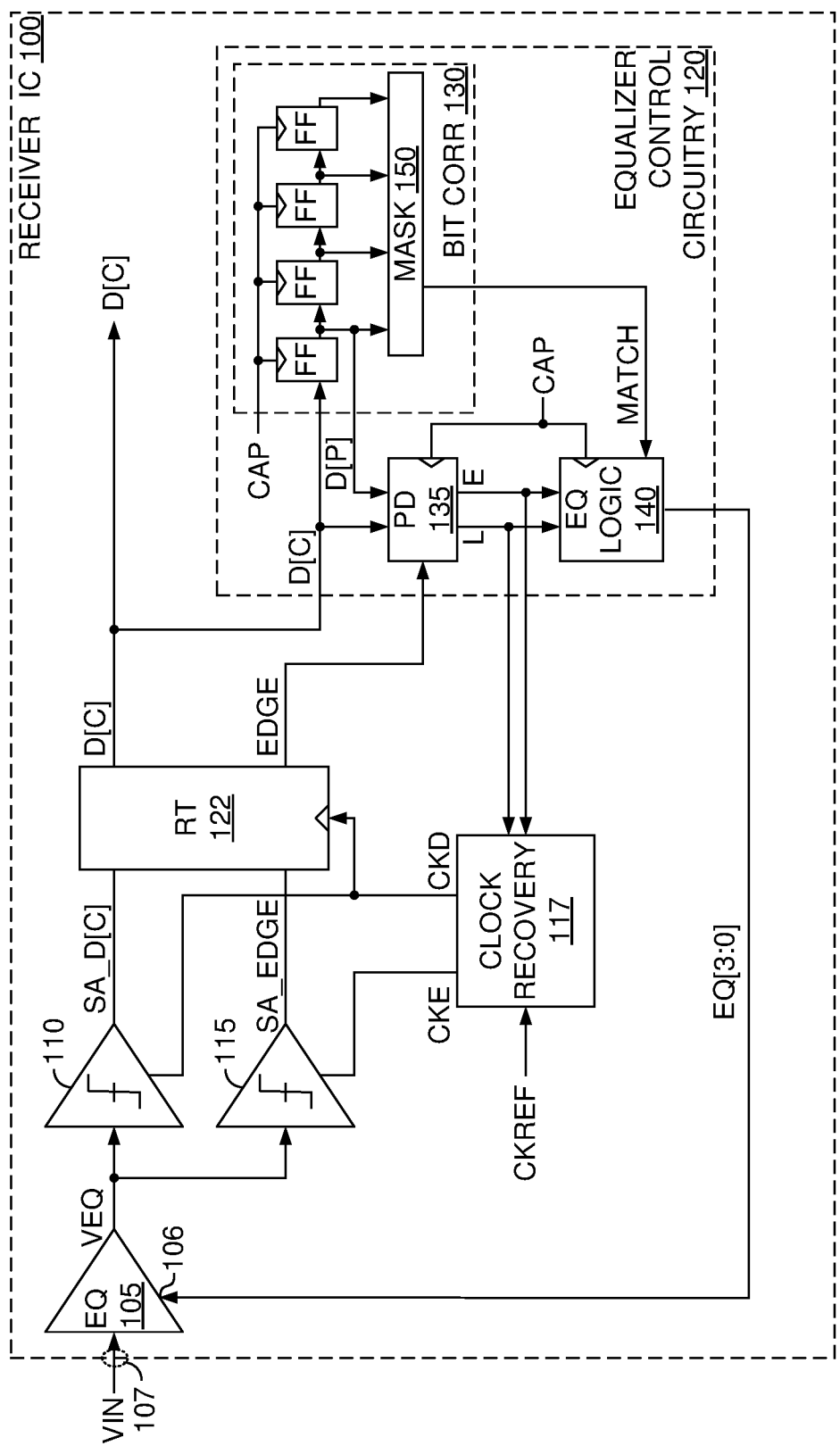
FIG. 1 depicts an integrated receiver 100 that supports adaptive receive equalization in accordance with one embodiment.

FIG. 1 depicts an integrated receiver 100 that supports adaptive equalization in accordance with one embodiment. As is typical in serial receiver architectures, an incoming bit stream is sampled using edge and data clock signals derived from a reference clock signal. A phase detector determines whether the edge and data clock signals are in phase with the incoming data, while some clock recovery circuitry adjusts the edge and data clock signals as required to match their phases to the incoming data. In accordance with the depicted embodiment, receiver 100 employs the same edge and data samples used to recover the phase of the incoming data stream to optimize receive equalization. This reuse of the clock and data recovery circuitry for adaptive equalization is power efficient and adds little complexity.

Receiver 100 includes an equalizer 105 that equalizes an input data signal VIN from a receive port 107 to produce an equalized data signal VEQ on a single-ended or differential equalizer output port. (As with other designations herein, VIN and VEQ refer both to signals and their corresponding ports, lines, or nodes; whether a given designation refers to a signal, node, or port will be clear from the context.) Equalizer 105 adjusts the magnitude (e.g., voltage and/or current) of at least some data symbols in data signal VIN to account for differences in the spectral content of the symbols and symbol patterns. In some embodiments, equalizer 105 selectively adjusts the voltage amplitude of at least some of the data symbols in data signal VIN, whereas in other embodiments equalizer 105 selectively adjusts the current used to express at least some of the data symbols in data signal VIN. Assuming the associated channel exhibits a low-pass filter effect, equalizer 105 amplifies input data signal VIN using a range of amplification factors, with higher frequency components of VIN being treated to higher amplification factors. In that case, the degree to which equalizer 105 amplifies higher frequency signals relative to lower frequency signals can be adjusted via an equalizer control port 106 coupled to control bus EQ[3:0].

Each of a data sampler 110 and an edge sampler 115 samples the equalized data signal VEQ from equalizer 105 in time with respective data and edge clocks CKD and CKE, which clock recovery circuitry 117 derives from a local bit-rate reference clock signal CKREF. Data sampler 110 issues a series of data samples on a sampler output port SA_D[C], where "C" is for "current" sample, whereas edge sampler 115 issues a series of edge samples on a second sampler output port SA_EDGE.

Equalizer control circuitry 120 is coupled to the control port of equalizer 105, and to the outputs of data and edge samplers 110 and 115 via a retimer 122 that re-times both edge and data samples into the CKD time domain. The retimed versions of the data and edge samples are conveyed on respective data and edge ports D[C] and EDGE. As detailed below, control circuitry 120 determines whether edge transitions associated with specific incoming data patterns are early or late with respect to edge clock CKE. Control circuitry 120 then adjusts equalizer 105 to align those edge transitions with the edge clock. To this end, control circuitry 120 includes a bit correlator 130 that issues a match signal MATCH in response to a specific data pattern or patterns, a phase detector 135 that issues relative-timing signals L (late) and E (early) indicative of whether edge transitions of incoming bits are late or early, respectively, with respect to edge clock CKE, and some equalization logic 140 that issues control settings to equalizer 105 in response to the relative-timing signals and the match signal. The early and late signals E and L from corresponding relative-timing ports of phase detector 135 are also conveyed to clock recovery circuitry 117 for use in aligning edge and data clock signals CKE and CKD with the incoming data signal. Phase detector 135 and clock recovery circuitry 117 may be part of conventional clock and data recovery (CDR) circuitry employed by receiver 100. Other embodiments employ an analog phase detector to provide the early/late determination. In the depicted embodiment, a clock signal CAP to bit correlator 130, phase detector 135, and equalization logic 140 is a gated version of signal CKD, which allows the CDR and equalizer control circuitry to be run in a burst-mode to save power. The percentage of time the signal CAP is enabled may depend upon the CDR bandwidth requirements of the system.

Phase detector 135, which may be an Alexander (bang-bang) phase detector, logically combines the current data sample D[C], the prior data sample D[P], and the edge sample EDGE between the current and prior data samples to determine whether the data edge between the current and prior data samples is early or late with respect to edge clock CKE. Alexander phase detectors are well known to those of skill in the art, so a detailed discussion is omitted. Briefly, samples D[C], D[P], and EDGE are re-timed versions of the incoming data signal. Samples D[C] and D[P] are one bit period (one unit interval) apart, and sample EDGE is sampled at half the bit period between samples D[C] and D[P]. If the current and prior samples D[C] and D[P] are the same (e.g., both represent logic one), then no transition has occurred and there is no "edge" to detect. In that case, the outputs E and L of phase detector 135 are both zero. If the current and prior samples D[C] and D[P] are different, however, then the edge sample EDGE is compared with the current and prior samples D[C] and D[P]: if sample EDGE equals prior sample D[P], then late signal L is asserted; and if sample EDGE equals current sample D[C], then the early signal E is asserted. In this disclosure, a "late" data edge arrives late with respect to the sampling clock, whereas an "early" data edge arrives early with respect to the sampling clock.

Bit correlator 130 employs a series of flip-flops and a pattern mask 150 to determine whether the series of symbols expressed by the incoming data signal matches a specified pattern. Bit correlator 130 requires an exact match, but this may not be required in every embodiment. For example, some embodiments allow the user to specify a mask bit pattern that allows the exclusion of bit positions within the pattern from being included in identifying matches.

Figure 2:
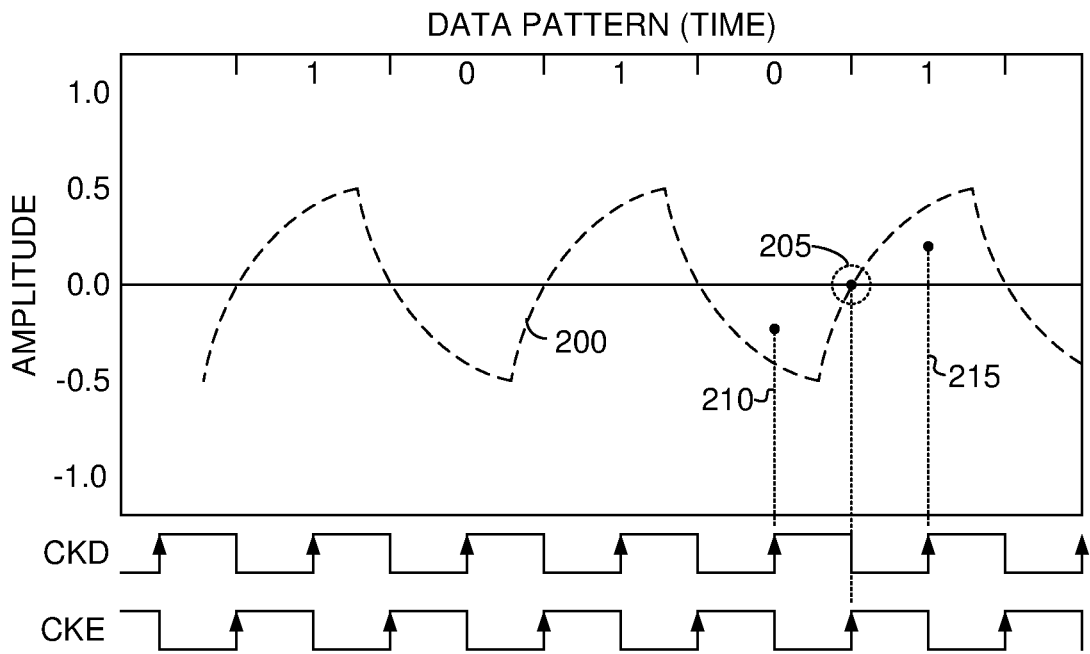
FIGS. 2 and 3 depict unequalized input data signals for two data patterns, (10101) and (11101), respectively, to illustrate how different data patterns suffer different levels of distortion.
Figure 3:
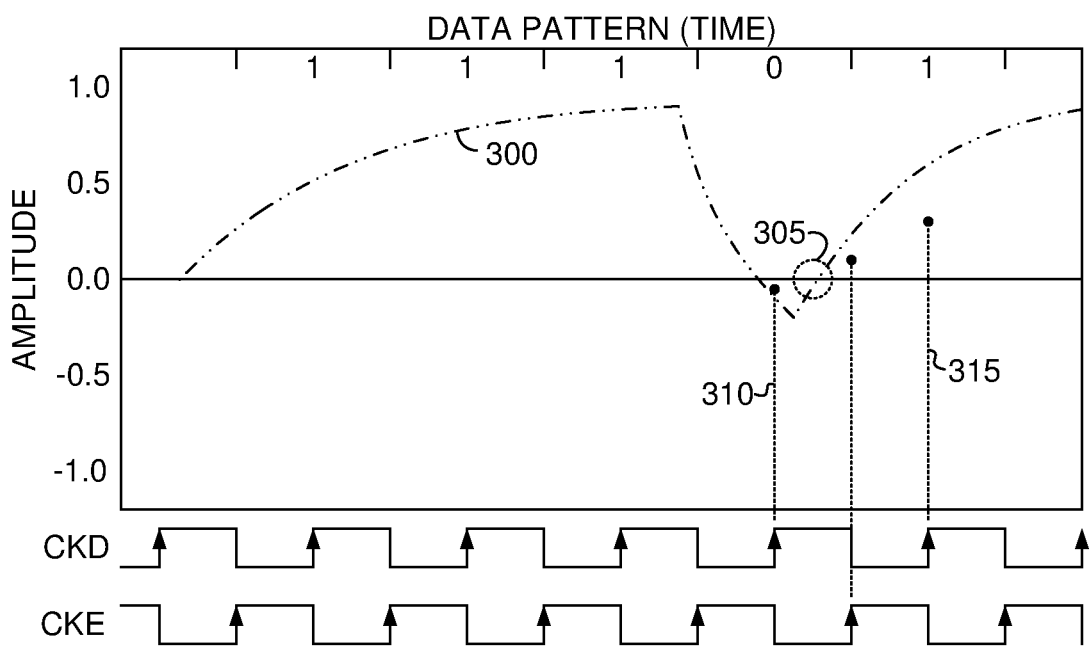

FIGS. 2 and 3 depict unequalized input data signals for two data patterns, (10101) and (11101), respectively, to illustrate how different data patterns suffer different distortion. In FIG. 2, the data pattern 200 of alternating ones and zeroes is symmetrical above and below zero amplitude. The zero crossing 205 is centered on a rising edge of edge clock CKE between data sample instants 210 and 215. In FIG. 3, the data pattern 300 that begins with a string of ones is asymmetrical about the zero-amplitude axis. The zero crossing 305 is consequently offset with respect to a rising edge of edge clock CKE between data sample instants 310 and 315. The distortion greatly reduces the area of pattern 300 below the zero-amplitude line at sample instant 310, and thus increases the probability of a sample error. The equalization methods and circuits detailed herein recognize that edge and data distortion are pattern specific and focus on reducing the edge distortion of the most troublesome data pattern or patterns.

Figure 4:
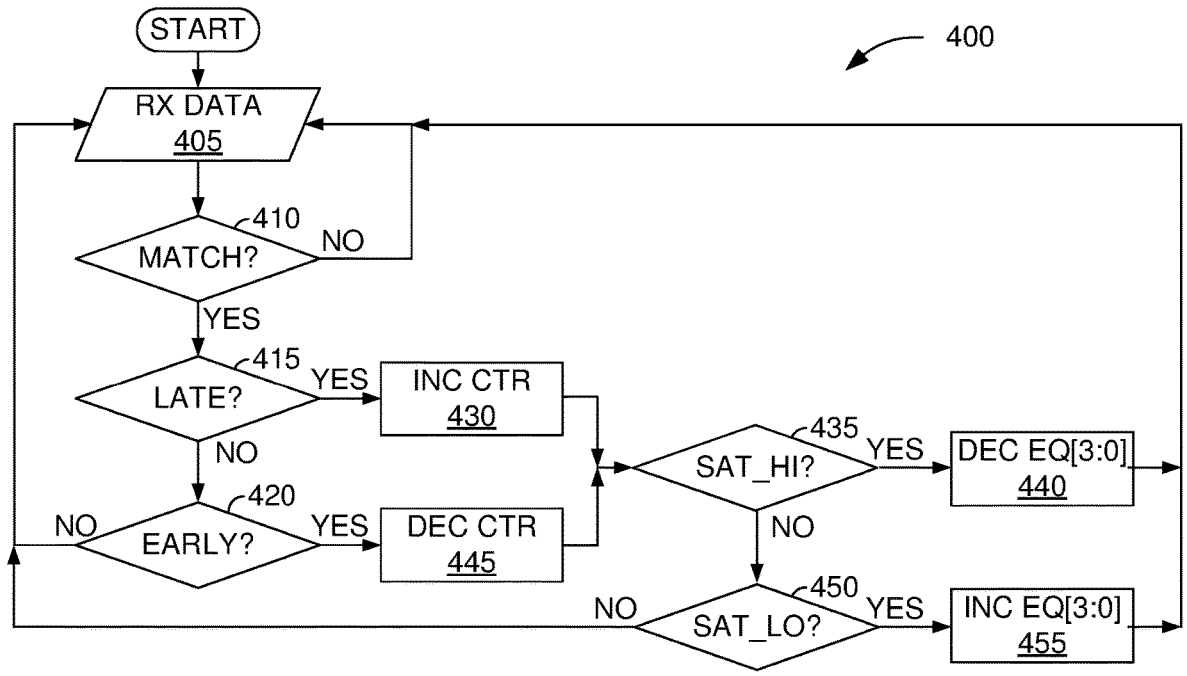
FIG. 4 is a flowchart 400 describing an adaptive equalization method carried out by receiver 100 of FIG. 1.

FIG. 4 is a flowchart 400 describing an adaptive equalization method carried out by receiver 100 of FIG. 1 in accordance with one embodiment. In this example, pattern mask 150 may be assumed to be configured to compare incoming data to pattern (11101), the pattern of waveform 300 of FIG. 3. Waveform 300 is reproduced in FIG. 5 to illustrate the impact of equalization on pattern 300.

Beginning at step 405, receiver 100 begins receiving data. The flip-flops within bit correlator 130 provide the incoming data patterns to pattern mask 150. Per decision 410, in the event the incoming data matches the selected pattern (11101), bit correlator 130 asserts match signal MATCH; otherwise, control circuitry 120 simply awaits the next data bit.

If ever the incoming data and mask bits do match, equalization logic 140 considers the early and late signals L and E from phase detector 135 (decisions 415 and 420). If the current and prior data symbols D[C] and D[P] are the same, there is no edge to be late or early, so decisions 415 and 420 merely return the flow to step 405 to await the next data sample. If late signal L is asserted, however, equalization logic 140 increments a counter (step 430) that filters the "yes" signals from decision 415. If the counter of step 430 saturates high (decision 435), equalization logic 140 resets the counter and decrements equalization control signal EQ[3:0] on the like-named control bus (step 440) to reduce the amplification factor imposed on high-frequency signal components.

If late signal L is not asserted for decision 415, the process flow moves to decision 420 for consideration of early signal E. If early signal E is asserted, equalization logic 140 decrements the counter noted above in connection with step 430 (step 445). If the counter saturates low (decision 450), equalization logic 140 resets the counter and increments equalization control signal EQ[3:0] (step 455) to increase the amplification factor imposed on high-frequency signal components. Of interest, the flow should not proceed from decision 420 directly to block 405 in the example in which a match requires pattern (11101) because that pattern always includes a transition, zero-to-one, between the last two bits.

Figure 5:
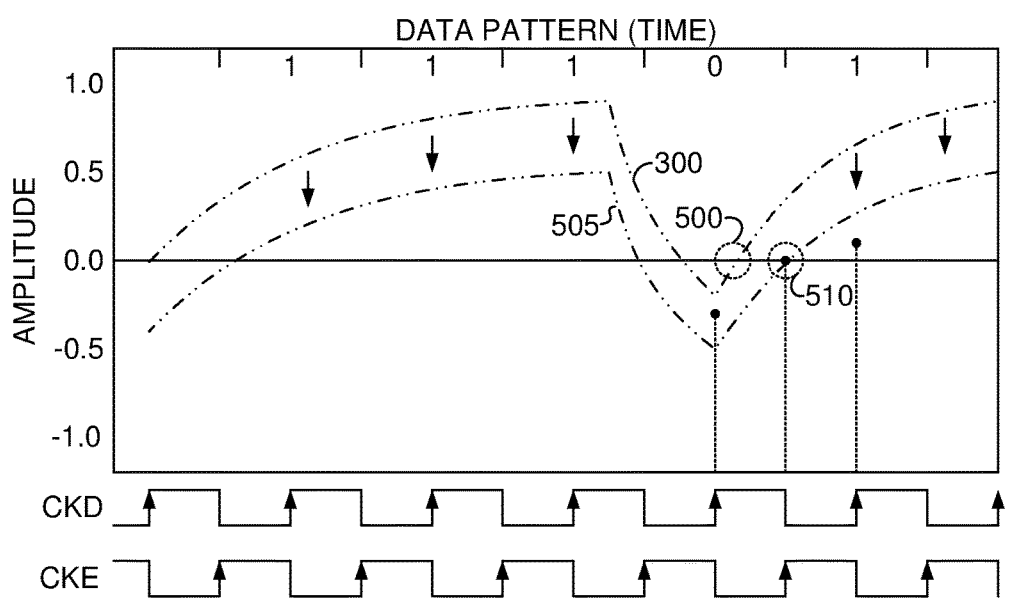
FIG. 5 is a waveform diagram illustrating an unequalized waveform 300 and a corresponding equalized version of waveform 300 as a waveform 505.

Turning to the example of FIG. 5, waveform 300 corresponds to the bit pattern specified by pattern mask 150, and exhibits an edge with a zero crossing 500 that is early relative to the rising edge clock at instant 505. Per FIG. 4, the combination of an early zero crossing and a matching data pattern causes equalization control signal EQ[3:0] to increment. The process will continue, with the equalization control signal changing each time the incoming data pattern matches the mask bit pattern until the equalized waveform exhibits a zero crossing synchronized to edge clock CKE. Such a synchronized waveform 505, with zero crossing 510, is depicted in FIG. 5.

Figure 6:
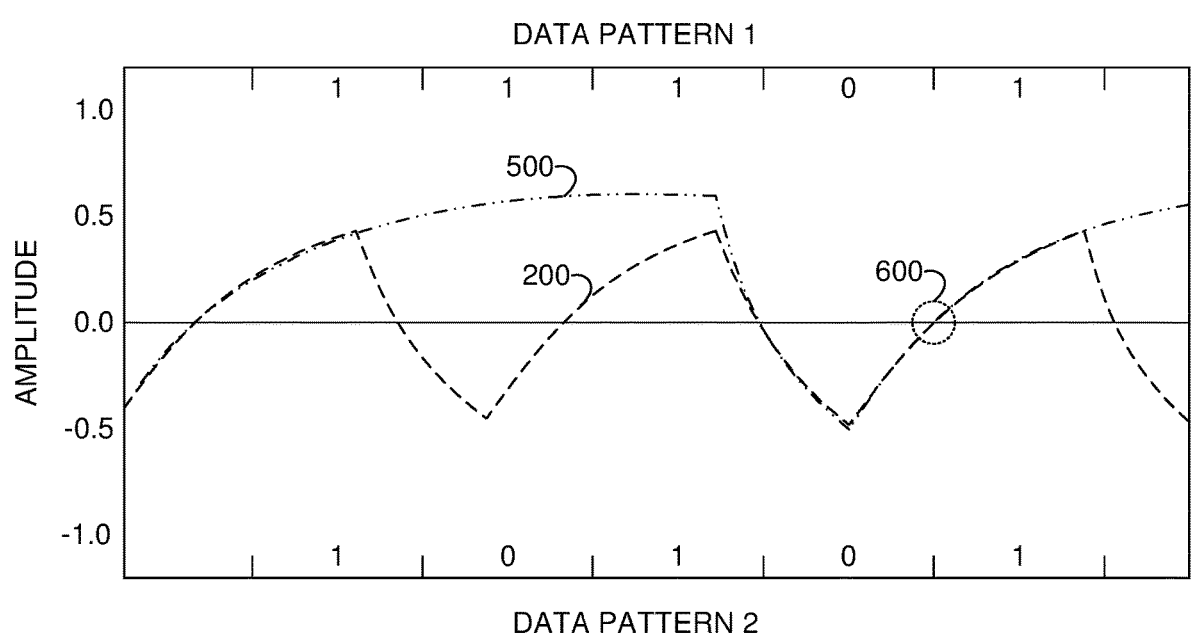
FIG. 6 depicts waveforms 200 and 500, of FIGS. 2 and 5 respectively, overlaid to show coincident zero crossings for the two waveforms.

Applicant has discovered that, in certain circumstances, equalizing incoming signals to minimize the timing error associated with the worst-case data pattern or patterns may provide suitable timing for less-sensitive data patterns. Setting the equalizer based upon the worst-case data pattern or patterns therefore causes incoming signals associated with various data patterns to exhibit coincident zero crossings, as is desired. FIG. 6 depicts waveforms 200 and 500, of FIGS. 2 and 5 respectively, overlaid to show coincident zero crossings 600 for the two waveforms. The example of FIG. 6 shows the convergence of just two waveforms for ease of illustration. The consideration of additional data patterns and associated waveforms may provide better signal convergence in other embodiments.

In the example of FIG. 4, the decision to increment or decrement equalization signal EQ[3:0] is based upon that pattern (11101), in which case a number of early matches should result in an increase in signal EQ[3:0] and a number of late matches should result in a decrease. Other patterns would require the opposite equalization signal adjustment for early and late matches, however. Early matches for pattern (00001) might require a reduction in equalization signal EQ[3:0], for example, instead of an increase. Equalization logic 140 can therefore be adapted to provide pattern-specific feedback to equalizer 105. One such embodiment is detailed below in connection with FIGS. 14 and 15.

Figure 7:
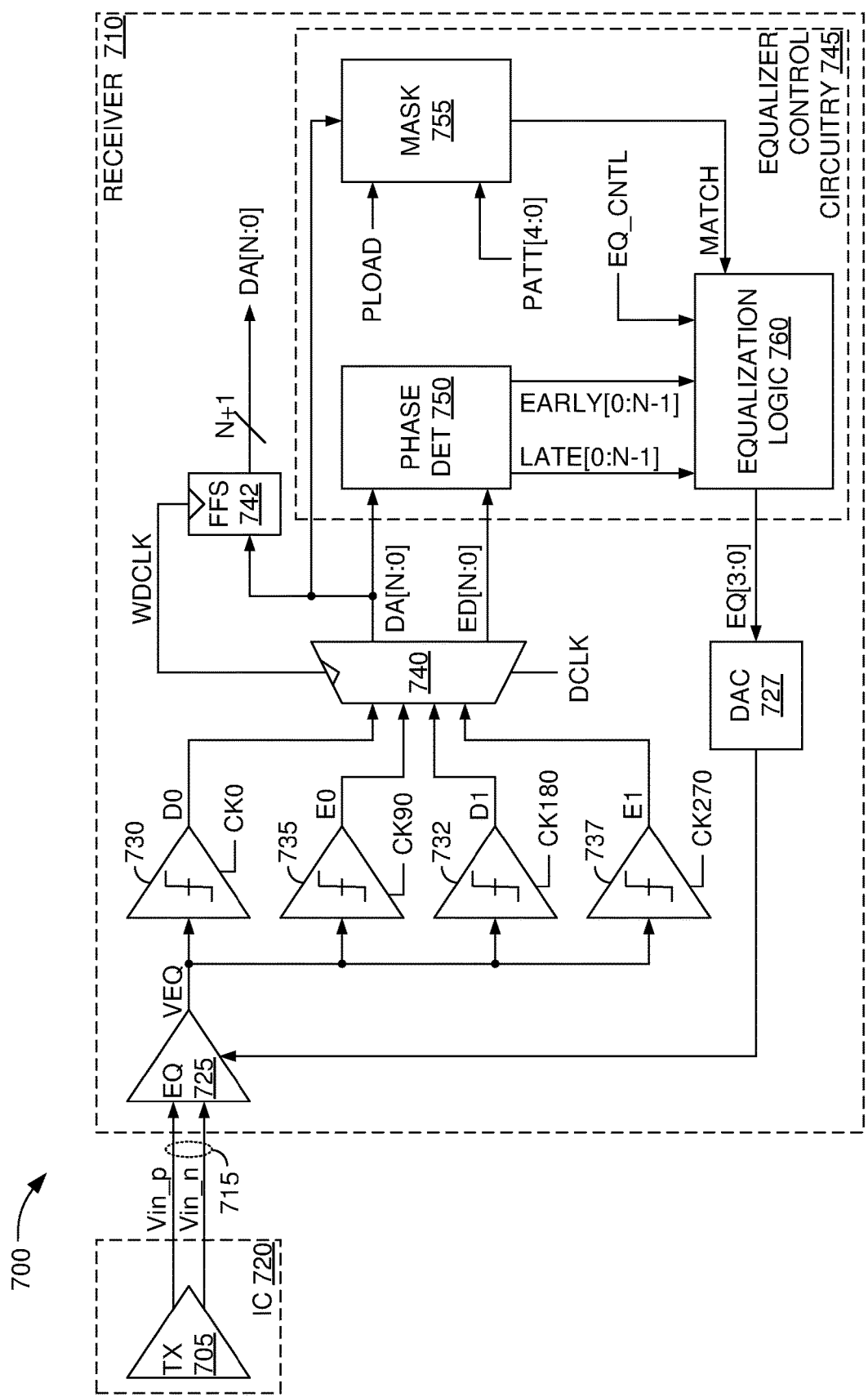
FIG. 7 depicts a double-data-rate (DDR) communication system 700 in accordance with another embodiment.

FIG. 7 depicts a double-data-rate (DDR) communication system 700 in accordance with another embodiment. System 700 includes a transmitter 705 that transmits a differential input data signal Vin (Vin_p/Vin_n) to a receive port of a receiver 710 via a differential channel 715. A conventional transmitter may be employed as transmitter 705, so a detailed treatment is omitted here for brevity. Transmitter 705 optionally includes transmit pre-emphasis circuitry (not shown) to dynamically adjust data signal Vin to reduce signal distortion caused by the effects of channel 715. Such transmit pre-emphasis circuitry may include, for example, a multi-tap transmit amplifier adapted to cause the voltage amplitudes of the data symbols of signal Vin to be selectively increased or decreased based of the data values of pre and/or post cursor data symbols. Transmitter 705 is typically part of a larger integrated circuit (IC) 720. Although not shown, if a suitable backchannel is provided between receiver 710 and transmitter 705 the pattern-specific feedback methods and circuitry of receiver 710 can be used to adaptively optimize transmit preemphasis.

Receiver 710 includes an equalizer 725 that equalizes data signal Vin to produce an equalized data signal VEQ. Equalizer 725 adjusts the magnitude of at least some data symbols in data signal VIN. In one embodiment, equalizer 725 amplifies signal VIN using a range of amplification factors, with higher frequency components being treated to higher amplification factors to, for example, compensate for the low-pass nature of channel 715. The degree to which equalizer 725 amplifies higher frequency signals relative to lower frequency signals can be adjusted via an equalizer control bus EQ[3:0]. In this example, a control port of equalizer 725 receives analog control signals derived from signal EQ[3:0] by a digital-to-analog converter (DAC) 727, though equalizer 725 may respond directly to digital signals in other embodiments.

In support of DDR operation, two data samplers 730 and 732 sample odd and even data symbols using data clocks CK0 and CK180, respectively, to produce corresponding odd and even data samples D0 and D1. A pair of edge samplers 735 and 737 likewise sample odd and even edges using edge clocks CK90 and CK270, respectively, to produce odd and even edge samples E0 and E1. A deserializer 740 combines the odd and even data samples into N+1 bit data words DA[N:0], and further combines the odd and even edge samples into N+1 bit edge words ED[N:0]. Data words DA[N:0] are conveyed into the integrated circuit as the received data via a register 742. For both edge and data samples, the bit "N" corresponds to the eldest serial sample and the bit "0" refers to the most recent.

Deserializer 740 is timed, in this embodiment, using a data clock signal DCLK and a word-clock signal WDCLK. Signal DCLK is derived from the same DDR clock source used to generate clock signals CK0, CK90, CK180, and CK270. The purpose of signal DCLK is to retime all the data and edge samples into the same time domain and to operate the deserializer. Data is clocked out of deserializer 740 using word-clock signal WDCLK. Register 742 downstream from deserializer 740 is also timed to word-clock signal WDCLK.

Receiver 710 includes equalizer control circuitry 745 that adjusts equalization control signal EQ[3:0] based upon phase information derived from data and edge words DA[N:0] and ED[N:0] for specific data patterns. In accordance with the depicted embodiment, phase information is only considered when the incoming data word exhibits one or more particular data patterns PATT[4:0]. As in the foregoing examples, the data pattern or patterns may be selected such that correcting for phase error associated the selected pattern or patterns produces a suitable equalization setting for all expected data patterns.

Control circuitry 745 includes an Alexander phase detector 750, a pattern mask 755, and equalization control logic 760. Phase detector 750 identifies data edges by comparing adjacent data samples and, where edges occur, compares the sampled edge between the adjacent samples to determine whether the edge is early or late. Phase detector 750 then provides, based upon these determinations, an N-bit late word LATE[N−1:0] and an N-bit early word EARLY[N−1:0]. Pattern mask 755 compares each five-bit subset of each data word DA[N:0] with five-bit pattern PATT[4:0] and identifies matches by asserting signal MATCH. Control logic 760 then adjusts equalization control signal EQ[3:0] when a counter (not shown) saturates high or low, thus indicating that match signal MATCH is occurring more frequently in conjunction with either early signals or late signals. Phase detector 750 may be part of the clock-recovery circuitry (not shown) used to derive clock signals CK0, CK90, CK180, and CK270. The selected pattern is loaded via a pattern bus PATT[4:0] upon assertion of a load signal PLOAD.

Figure 8:
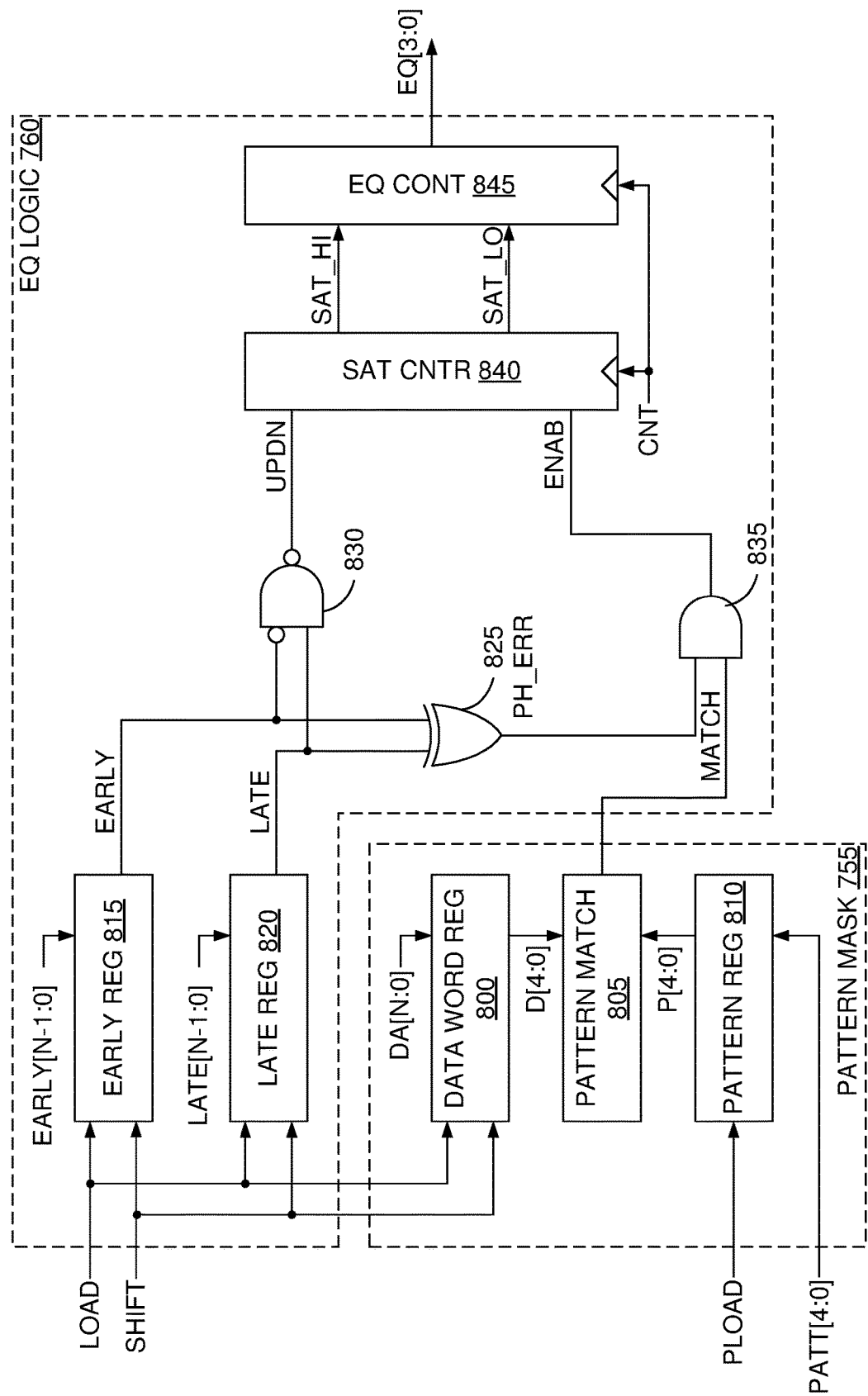
FIG. 8 depicts pattern mask 755 and equalization logic 760, both of FIG. 7, in accordance with one embodiment.

FIG. 8 depicts pattern mask 755 and equalization logic 760, both of FIG. 7, in accordance with one embodiment. Pattern mask 755 loads each data word DA[N:0] into a register 800 upon assertion of a load signal LOAD. Pattern-matching logic 805 compares the first five-bit series in register 800 (bits D[4:0]) to a selected five-bit pattern PATT[4:0] previously loaded into a pattern register 810. A shift signal SHIFT is periodically asserted to shift the data in register 800 to drop the most recent data sample, thus presenting the next five-bit series to pattern-matching logic

805. Pattern-matching logic 805 asserts a match signal MATCH when a match is encountered. As in the previous example, the selected pattern is (11101), though another pattern or other sets of patterns might also be used. A multi-pattern embodiment is detailed below in connection with FIGS. 14 and 15.

Equalization logic 760 includes early and late registers 815 and 820, into which are loaded N early bits and N late bits, respectively. As with data word register 800, the early and late bits are loaded and shifted when the signals LOAD and SHIFT are asserted. The most recent early and late bits in respective registers 815 and 820 output as early and late signals EARLY and LATE, respectively.

Equalization logic 760 additionally includes an XOR gate 825, a NAND gate 830, an AND gate 835, a saturation counter 840, and a counter 845. XOR gate 825 asserts a phase error signal PH ERR when either of the early and late signals is asserted. AND gate 835 asserts an enable signal ENAB when pattern mask 755 identifies a match and the early and late registers indicate a phase error. The enable signal ENAB allows saturation counter 840 to increment or decrement. NAND gate 830 combines the early and late signals EARLY and LATE such that signal UPDN is asserted when early signal EARLY is asserted and late signal LATE is deasserted, and is deasserted when early signal EARLY is deasserted and late signal LATE is asserted. Asserting (deasserting) signal UPDN causes counter 840 to increment (decrement) when enabled. Counter 840 thus counts up or down, depending upon the timing of a zero crossing, when the pattern of received data matches a selected pattern.

Figure 9:
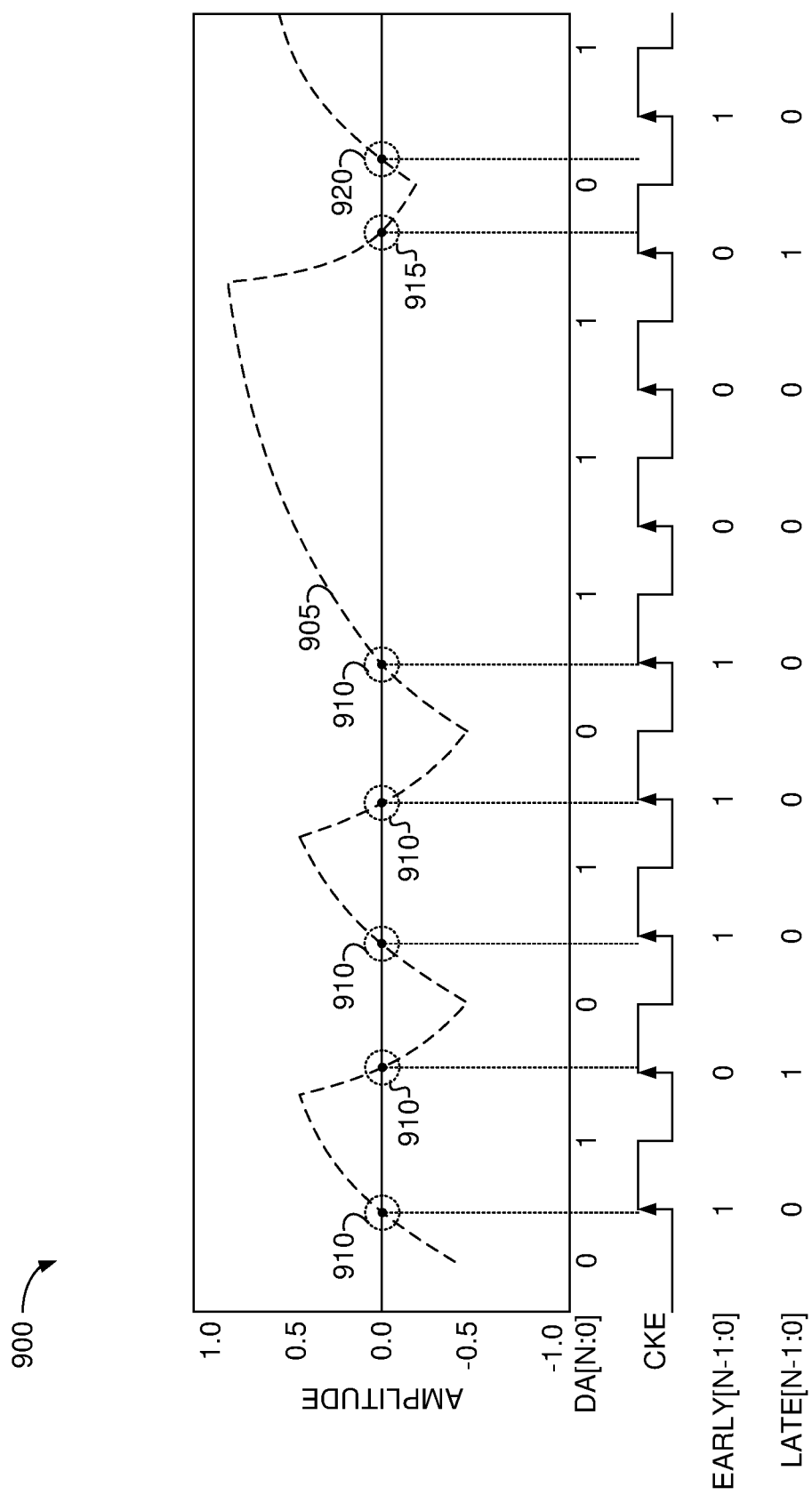
FIG. 9 is a waveform diagram 900 illustrating the operation of pattern mask 755 and the early and late registers 815 and 820 upon receipt of a ten-bit data word.

FIG. 9 is a waveform diagram 900 illustrating the operation of pattern mask 755 and the early and late registers 815 and 820 upon receipt of a ten-bit data word (0101011101) extracted from a received waveform 905 (i.e., DA[9:0]= (0101011101), where DA9 is the eldest bit). The eldest bit is depicted at the far left of diagram 900, so the binary number DA[9:0] should be read from right to left. Clock signal CKE combines the sample instants of the two edge clock signals CK90 and CK270 to illustrate edge-sample timing.

The first half of waveform 905 is alternating ones and zeros, and the first five zero crossings 910 are close to the corresponding rising edges of clock signal CKE. The sampled zero crossings for such relatively symmetrical waveforms can be expected to fluctuate between early and late due to random and periodic jitter sources. The latter half of waveform 905 exhibits a series of ones with an intervening zero, which produces a pair of edges for which the zero crossings 915 and 920 are relatively far from the corresponding edges of clock signal CKE. The outputs of phase detector 750 (FIG. 7) are binary, so the early and late data do not differentiate between edge samples that are slightly off and those that are relatively far off. Recall also that both early and late signals are zero when no transition is detected (i.e., when two adjacent data symbols have the same value). As depicted in FIG. 9, the early and late words for the hypothetical waveform 905 are, with bits read from left (eldest) to right (newest): EARLY[8:0]=(101110001); and LATE[8:0]=(010000010).

The following Table 1 illustrates the examination of the data word DA[9:0]=(0101011101) of FIG. 9 by pattern mask 755 and the early and late registers 815 and 820 to determine whether to adjust equalization signal EQ[3:0]. The ten-bit data word has six unique five-bit series, which are underlined in respective rows zero to five in Table 1. Series zero, the five most recent bits (11101), matches the selected pattern of this example. Pattern mask 755 thus asserts match signal MATCH (MATCH=1). The early bit corresponding to the last transition of (11101) is asserted and the late bit deasserted (the underlined early and late bits of Series zero in Table 1), so signal UPDN is asserted (UPDN=1). AND gate 835 also asserts enable signal ENAB because both match signal MATCH and phase-error signal PH ERR are asserted. Saturation counter 840 therefore increments. The five-bit series underlined in each row of column two in Table 1 corresponds to the bits D[4:0] presented to pattern-matching block 805.

TABLE 1

| SE-RIES | D[4:0] | MATCH | EARLY [8:0] | LATE [8:0] | ENAB | UPDN |
|---|---|---|---|---|---|---|
| 0 | 01010<u>11101</u> | 1 | 10111000<u>1</u> | 01000001<u>0</u> | 1 | 1 |
| 1 | 0101<u>01110</u>1 | 0 | 1011100<u>0</u>1 | 0100000<u>1</u>0 | 0 | 0 |
| 2 | 010<u>10111</u>01 | 0 | 101110<u>0</u>01 | 010000<u>0</u>10 | 0 | 1 |
| 3 | 01<u>01011</u>101 | 0 | 10111<u>0</u>001 | 01000<u>0</u>010 | 0 | 1 |
| 4 | 0<u>10101</u>1101 | 0 | 1011<u>1</u>0001 | 0100<u>0</u>0010 | 0 | 1 |
| 5 | <u>01010</u>11101 | 0 | 101<u>1</u>10001 | 010<u>0</u>00010 | 0 | 1 |

Each remaining five-bit series is likewise examined, with the shift from one series to the next taking place upon assertion of shift signal SHIFT. In practice, the data bits may be shifted out of register 800 one bit at a time to present each successive bit series to pattern matching logic 805. The first three early and late bits need not be considered, and may therefore be discarded. The early and late bits may be shifted out of their respective registers 815 and 820 one bit at a time, again upon assertion of signal SHIFT, to present the appropriate early and late bits EARLY and LATE for consideration in connection with the corresponding bit pattern. The five series numbered one through five do not result in pattern matches, so the count in counter 840 is unaffected despite the value of signal UPDN.

Shifting of the mask pattern is optional. Other embodiments match all or a subset of captured data words, ignoring unconsidered bits. In the foregoing embodiments, the shifting increases the amount of early/late information obtained for a given quantity of sample data and edge data.

Figure 10:
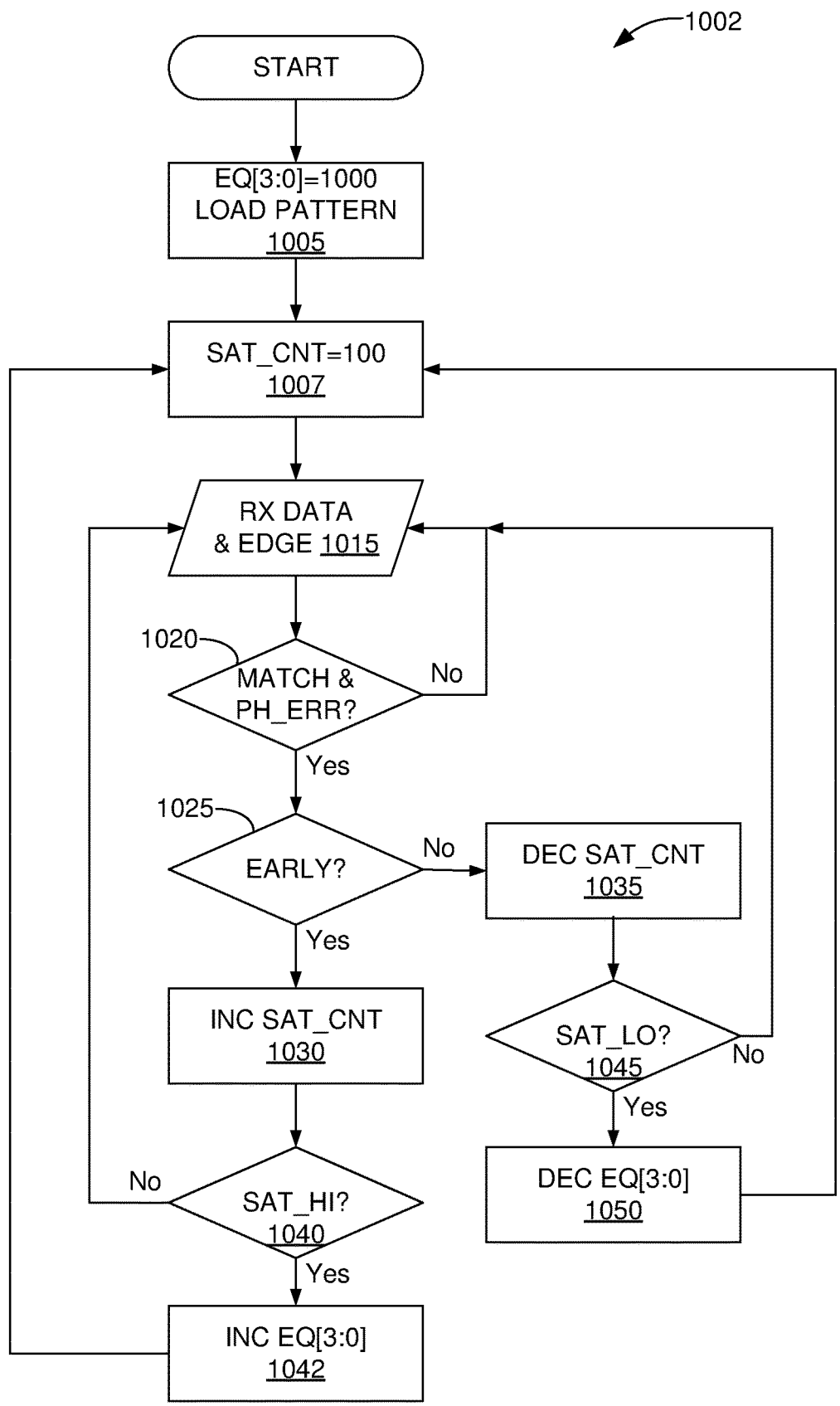
FIG. 10 is a flowchart 1002 depicting a method of operation for the circuitry of FIG. 8 in accordance with one embodiment.

FIG. 10 is a flowchart 1002 depicting a method of operation for the circuitry of FIG. 8 in accordance with one embodiment. Before initiating adaptive equalization, a pattern is selected to be the basis for equalization adaptation (step 1005). The pattern may be stored locally, e.g. in a volatile or non-volatile memory. Next, at step 1007, saturation counter 840 is set midrange, or binary 100 in this example.

Block 1015 represents the receipt of incoming data and edge samples. As noted above in connection with FIG. 8, the adaptation control circuitry receives data and edge samples in N+1 bit words. Each five-bit series within each data word is then compared to the selected pattern, while the early and late signals associated with the last signal transition of the five-bit series are considered to detect a phase error. Per decision 1020, if the current five-bit series matches the selected pattern, and the early and late signals indicate a phase error, then the method flow moves to decision 1025; otherwise, the process returns to block 1015 for consideration of the next five-bit series of data. The pattern selected to adjust equalization will exhibit an edge for comparison to the clock signal. Otherwise, the selected pattern will not provide an edge detection upon which to base a phase-error measurement. There should therefore be a phase-error signal whenever the selected pattern is encountered. XOR gate 825 and AND gate 835 are nevertheless included to exclude possible error states in which both early and late signals are one or zero in response to a data edge. Other embodiments omit gates 825 and 835, while still other embodiments include phase detectors designed to prevent the above-mentioned error states. Moreover, pattern mask 755 may not require an exact match to issue the match signal in some embodiments. Pattern mask 755 might, for example, assert match signal MATCH if at least three of the preceding five bits are a logic one. Gates 825 and 835 would then allow updates to saturation counter 840 only if the received pattern included a transition between the final two bits.

If phase error signal PH ERR is asserted, then the sampled edge was determined to be either early or late. In decision 1025, if early the zero crossing was determined to be early (i.e., if signal EARLY is asserted), then saturation counter 840 is incremented (step 1030). If the phase error is not due to an early signal, than late signal LATE was asserted, in which case saturation counter 840 is decremented (step 1035).

Considering next decision 1040, saturation counter 840 may reach the maximum count upon incrementing. If so, counter 840 asserts signal SAT_HI, the upper threshold, in which case equalization control logic 845 increments equalization control signal EQ[3:0] and counter 840 is reset to the midrange (steps 1042 and 1007). If counter 840 is not saturated, then the process returns to block 1015 for consideration of the next five-bit series of incoming data. Decision 1045 is similar to decision 1040, except that counter 845 is decremented (step 1050) if counter 840 asserts signal SAT_LO, the lower threshold. The upper and lower thresholds of saturation counter 840 may be adjusted in some embodiments.

The phase detector will periodically indicate early and late edges even when the equalization setting is optimal for a given operational environment. Assuming proper data alignment, the resulting early and late signals will tend to cancel each other over time. That is, counter 840 will drift between the upper and lower threshold levels without asserting either of signals SAT_HI or SAT_LO. When the edges of the incoming data signal are consistently misaligned with the edge clock, however, the errors will accumulate over time and will consequently produce appropriate counteracting adjustments to equalization control signal EQ[3:0]. Saturation counter 840 and equalization control logic 845 thus act as a low-pass filter for updates to the equalization settings.

Figure 11:
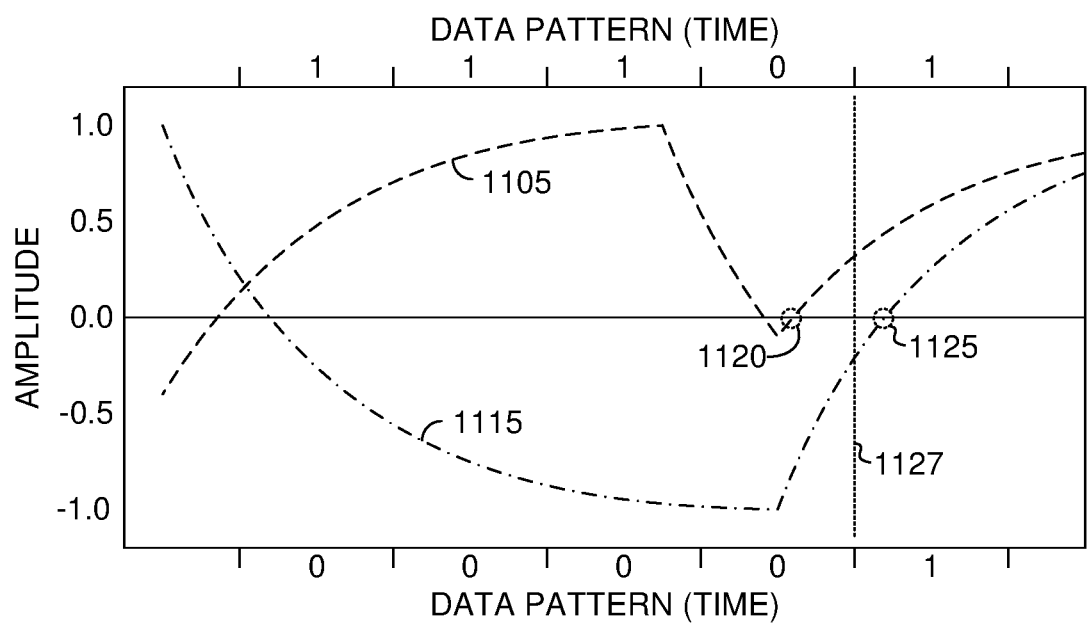
FIGS. 11 and 12 are waveform diagrams depicting a pair of data waveforms 1105 and 1115, representing respective received data patterns (11101) and (00001).
Figure 12:
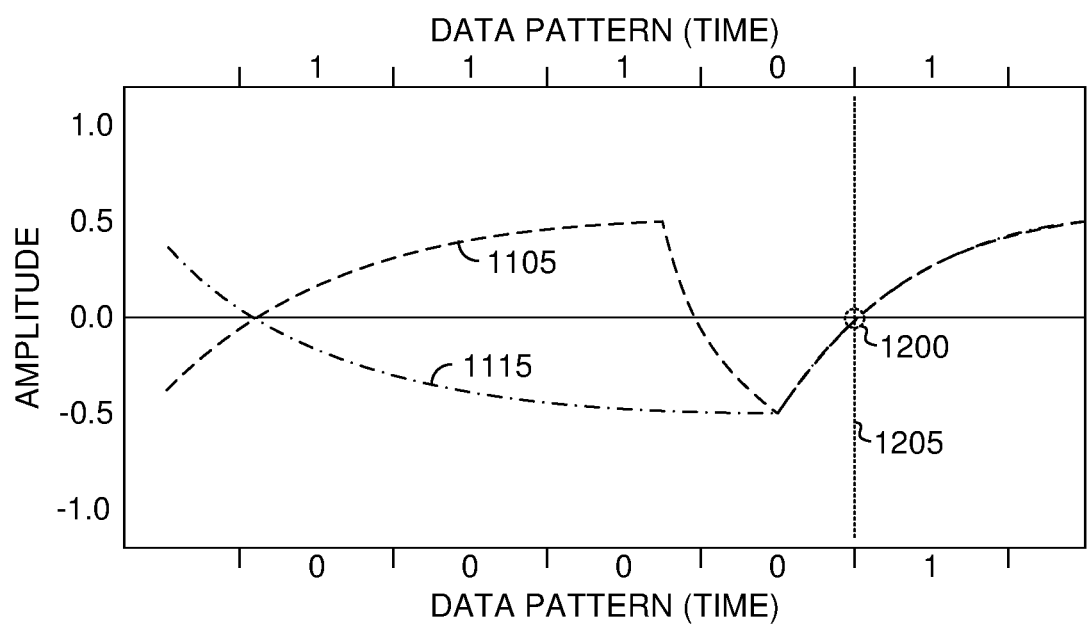

FIGS. 11 and 12 are waveform diagrams depicting a pair of data waveforms 1105 and 1115 representing respective received data patterns (11101) and (00001). FIG. 11 shows waveforms 1105 and 1115 prior to equalization adjustment. The zero crossings 1120 and 1125 of waveforms 1105 and 1115 are respectively early and late compared with edge clock sample instant 1127. Post calibration, depicted in FIG. 12, the zero crossings 1200 of both equalized waveforms 1105 and 1115 are aligned with respect to the edge clock sample instant 1205.

The two patterns of FIGS. 11 and 12 include transitions preceded by a stream of like bits. These patterns are therefore apt to provide outlying edge-sample timing, and may therefore provide appropriate measurements for optimizing the equalization setting. Because both patterns 1105 and 1115 are potentially troublesome, the associated patterns (11101) and (00001) can be used to determine the optimum equalization setting. In one embodiment, for example, equalization is adjusted to find the setting at which the zero crossing of these two data patterns most nearly converge on the sample instant. In other embodiments, the method of FIG. 10 may be repeated for several potentially troublesome patterns or sets of patterns. Subsequent equalization adaptation can then be based upon the pattern or set of patterns that provides the best performance, such as the lowest bit error rate, or the lowest power usage in achieving a minimum level of speed performance. The channel transfer function may be used to determine the bits in the selected pattern or patterns. Sufficiently long patterns may be used, for example, for echo cancellation. Furthermore, the bits under consideration need not be sequential.

Returning to the example of FIG. 11, there may be no equalization setting at which zero crossings 1120 and 1125 are coincident with the edge clock. In that case, an equalization setting may be selected such that zero crossings 1120 and 1125 are as nearly coincident as the equalizer permits, or are as nearly coincident as the equalizer permits with the limitation that one edge be early and the other late with respect to the edge clock.

Figure 13:
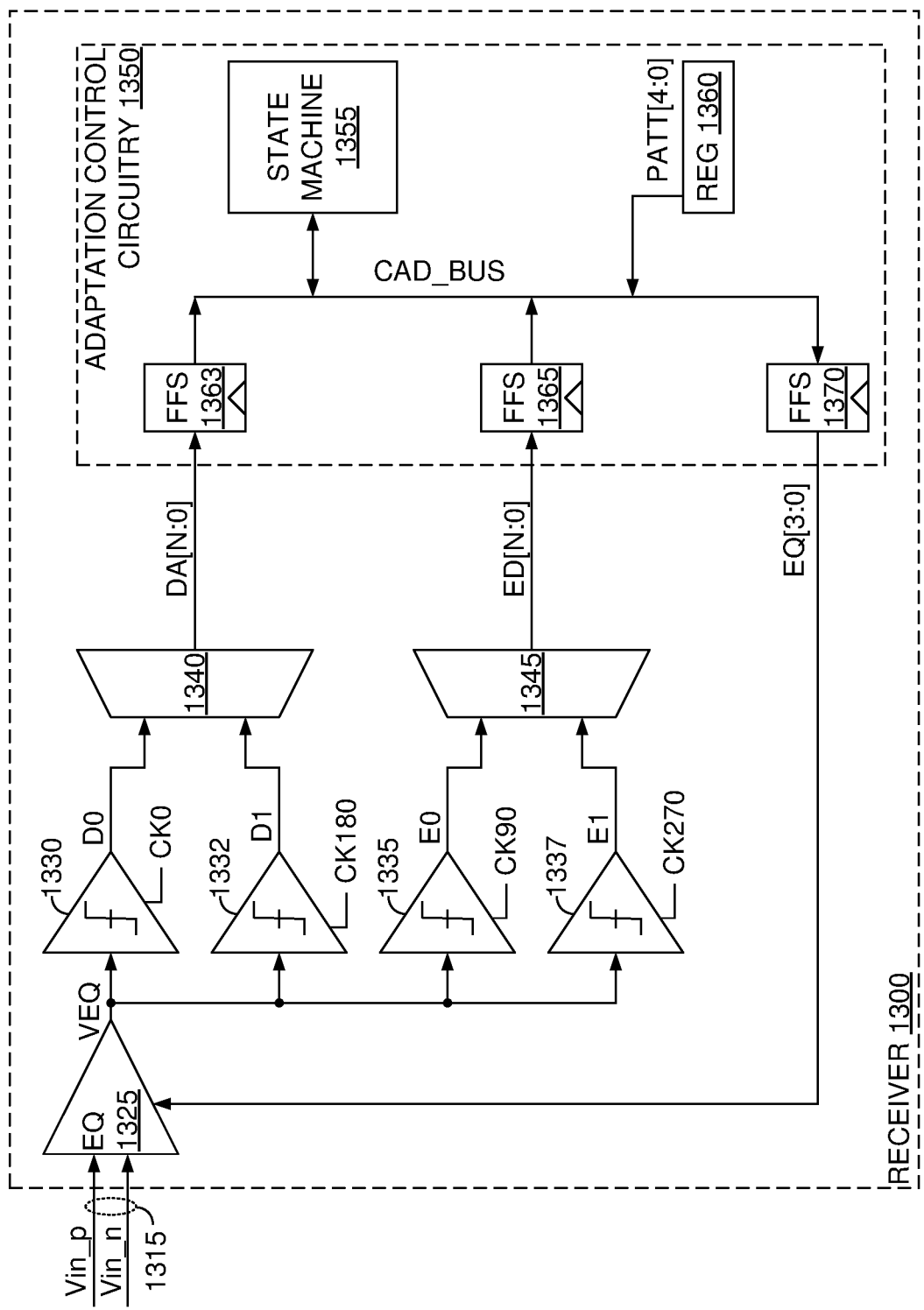
FIG. 13 depicts a DDR receiver 1300 in accordance with another embodiment. Receiver 1300 includes an equalizer 1325 that equalizes a differential input data signal Vin_p/Vin_n to produce an equalized signal VEQ.

FIG. 13 depicts a DDR receiver 1300 in accordance with another embodiment. Receiver 1300 includes an equalizer 1325 that equalizes a differential data signal Vin_p/Vin_n to produce an equalized signal VEQ. Equalizer 1325 is digitally controlled by an equalization control signal EQ[3:0] that, in this example, allows for selection of sixteen unique amplification factors that compensate for the low-pass nature of an incoming channel 1315.

In support of DDR operation, two data samplers 1330 and 1332 sample odd and even data symbols using data clocks CK0 and CK180, respectively, to produce corresponding odd and even data samples D0 and D1. A pair of edge samplers 1335 and 1337 likewise sample odd and even edges using edge clocks CK90 and CK270, respectively, to produce odd and even edge samples E0 and E1. A pair of deserializers 1340 and 1345 combine the odd and even data samples into N+1 bit data words DA[N:0], and further combine the odd and even edge samples into N+1 bit edge words ED[N:0]. Data words DA[N:0] are conveyed into the integrated circuit as the received data.

Receiver 1300 includes adaptation control circuitry 1350 that adjusts equalization control signal EQ[3:0] based upon phase information derived from data and edge words DA[N:0] and ED[N:0]. Control circuitry 1350 includes a state machine 1355, a pattern register 1360, a data-sample register 1363, an edge-sample register 1365, and an equalization-setting register 1370. Adaptation control circuitry 1350 employs these elements to provide the functionality of control circuitry 745 of FIG. 7. State machine 1355 may be a finite state machine dedicated to provide the functionality detailed herein, or may be a general-purpose processor programmed or configured to provide the requisite functionality. In one embodiment, for example, state machine 1355 is a Real Time Interface Co-processor (MC) programmed to consider the data and edge samples of registers 1363 and 1365 and a selected pattern or patterns in register 1360 to set the contents of register 1370, and thereby establish the equalization setting for equalizer 1325. State machine 1355 communicates with registers 1360, 1363, 1365, and 1370 via a common bus CAD BUS in this embodiment, though other embodiment may use one or more dedicated ports.

Figure 14:
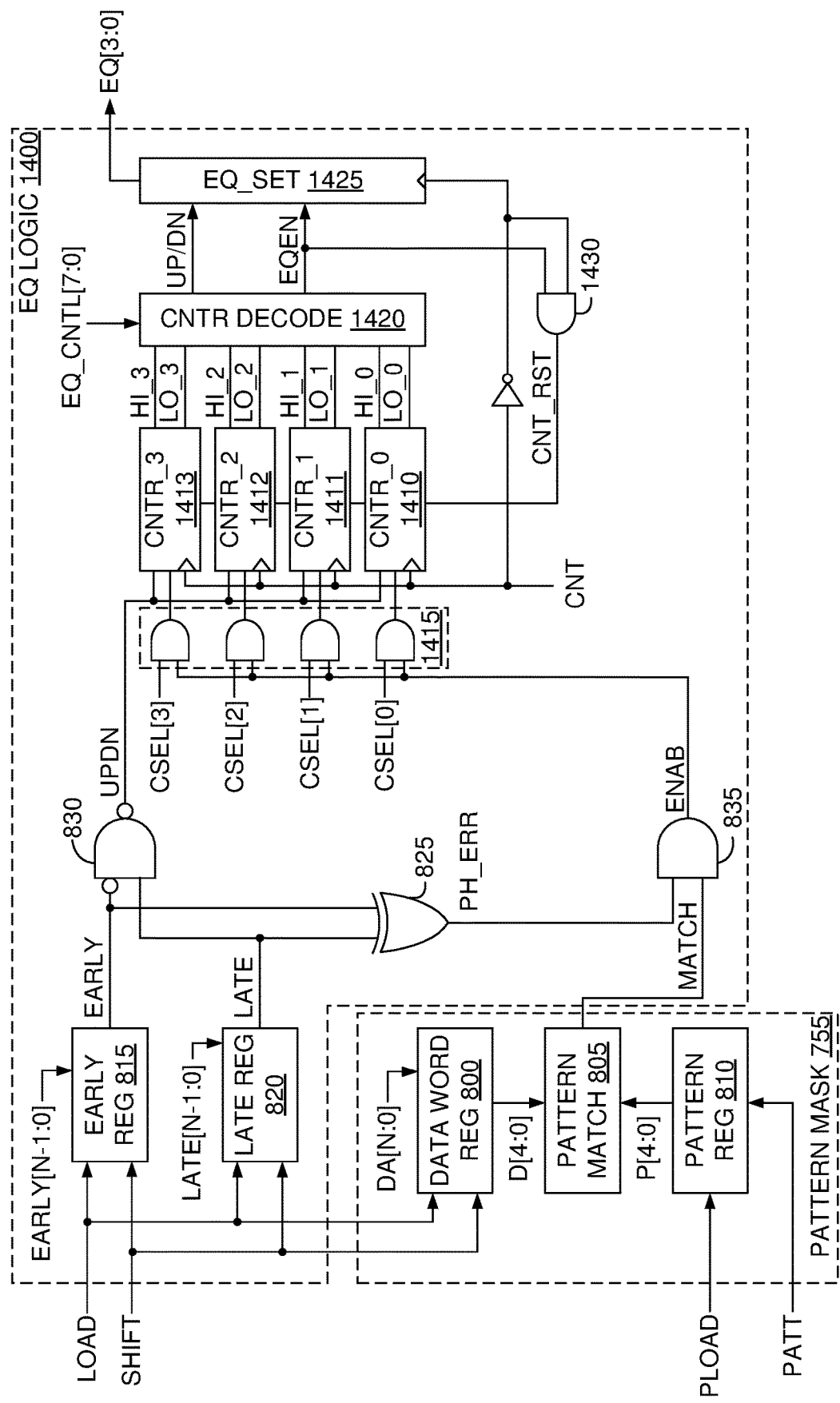
FIG. 14 depicts pattern mask 755 of FIG. 7 and some equalization logic 1400 that together adjust equalization signal EQ[3:0] responsive to up to four mask patterns.

FIG. 14 depicts pattern mask 755 of FIG. 7 and some equalization logic 1400 that together adjust equalization signal EQ[3:0] responsive to up to four mask patterns. The circuitry of this embodiment is similar to that of FIG. 8, like-numbered elements being the same or similar. Equalization logic 1400 can track MATCH indications for four patterns using respective counters 1410-1413. Counters 1410-1413 are selected by e.g. one-hot encoding on a select bus CSEL[3:0] gated via AND logic 1415.

In a typical example, a set of patterns for a low-pass channel is selected to reduce timing error in the rising and falling edges of a "lone 1" and "lone 0," such as those associated with the patterns (00001), (11110), (00010), and (11101). The number of bits in the selected patterns may be determined by the magnitude of attenuation at half of the bit frequency relative to the attenuation at DC: in general, more attenuation requires more pattern bits. For example, five-bit patterns may be appropriate for an attenuation of about −10 dB at half of the bit frequency relative to DC. Other patterns or sets of patterns may be required by systems with fixed training sequences or encodings, or by systems that employ channels with more complicated frequency responses. An appropriate set of patterns can be determined for a range of complex channels through simulation; alternatively, an in-situ exploration of the pattern space can be performed once the hardware is available. In the present example, all five-bit patterns could be considered, giving up to 32 patterns.

To begin with, a first of the selected patterns is loaded from the pattern bus PATT[4:0] into pattern register 810 upon the assertion of a pattern-load signal PLOAD. One of counters 1410-1413 is then selected by asserting one bit of select signal CSEL[3:0]. XOR 825 qualifies the resulting MATCH signals by requiring that only one of the EARLY or LATE signals must be asserted for a legal match. NAND gate 830 asserts the signal UPDN to instruct the selected counter to increment or decrement when ENAB is asserted. For a given pattern match, if LATE=1 and EARLY=0, the selected counter will decrement when count signal CNT is toggled; if LATE=0 and EARLY=1, the selected counter will increment when count signal CNT is toggled.

In this example, we wish to equalize the incoming signal using four patterns (00001), (11110), (11101), and (00010). First, pattern (00001) is loaded into pattern register 810, and select signal CSEL[3:0] is set to (0001) to select saturation counter 1410. All five-bit patterns in D[N:0] from register 800 are sequentially compared against the stored match pattern in register 810 by toggling SHIFT. Count signal CNT is toggled each time the pattern is shifted, to record whether early signal EARLY or late signal LATE is asserted for the selected pattern.

Next, the pattern (11110) is loaded into pattern register 810 and select signal CSEL[3:0] is set to (0010) to select counter 1411. The pattern matching process is then repeated as described above. Likewise, the process is repeated for pattern (11101) and counter 1412 and pattern (00010) and counter 1413. Over time, counters 1410-1413 will thus record the correlation of early and late indications for the four target patterns.

When high-frequency components of a data signal are attenuated more than the low-frequency components, counters 1410 and 1411 will tend to saturate low, and counters 1412 and 1413 will tend to saturate high. Such a state indicates that the equalizer should boost the high-frequency gain relative to the low-frequency gain. Conversely, when the low-frequency components of a data signal are attenuated more than the high-frequency components, counters 1410 and 1411 will tend to saturate high, and counters 1412 and 1413 will tend to saturate low. Such a state indicates that the equalizer should reduce the high-frequency gain relative to the low-frequency gain.

Counters 1410-1413 indicate their respective states to a decoder 1420 via respective lines HI_# and LO_#. Adjustment of equalization signal EQ[3:0], and consequently the equalizer, based on the state of saturating counter outputs is controlled by a counter decode block 1420. Block 1420 takes as inputs an 8-bit word constructed from the HI and LO outputs from the four saturating counters 1410-1413 and a control word EQ_CNTL[7:0]. When the word from counters 1410-1413 equals control word EQ_CNTL[7:0], decoder 1420 asserts up/down signal UP/DN and enable signal EQEN, causing an equalization set counter 1425 to increment the binary value EQ[3:0] on the falling edge of count signal CNT. When the word from counters 1410-1413 equals the inversion of control word EQ_CNTL[7:0], decoder 1420 deasserts up/down signal UP/DN and asserts enable signal EQEN, causing counter 1425 to decrement EQ[3:0] on the falling edge of count signal CNT. An AND gate 1430 generates a reset pulse CNT RESET whenever the counter 1425 changes state. This pulse resets the saturating counters to their central values, making them ready to measure the effect of the equalization adjustment.

Figure 15:
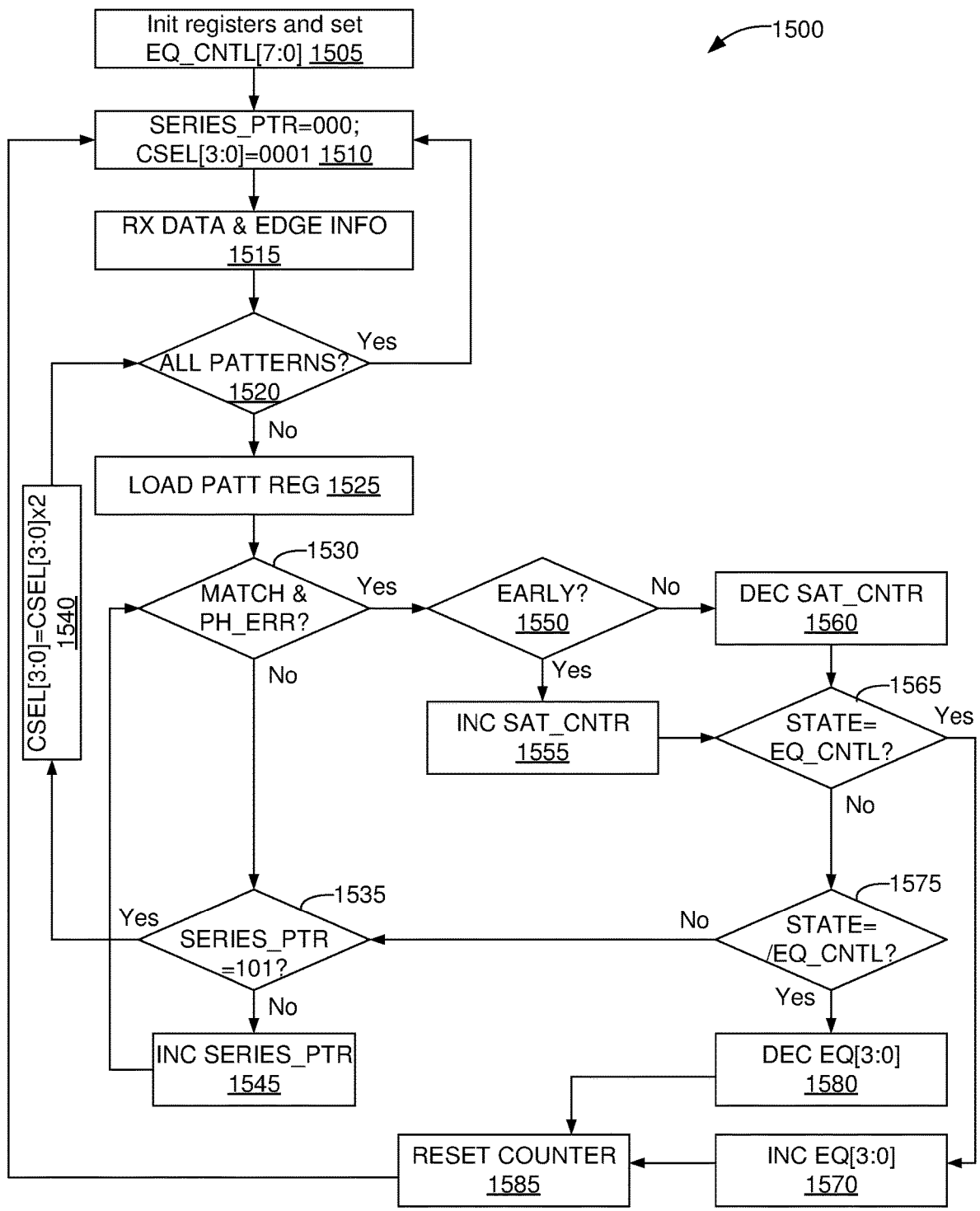
FIG. 15 is a flowchart 1500 depicting the operation of equalization logic 1400 of FIG. 14 in accordance with one embodiment. The logic of flowchart 1500 is described here in connection with FIG. 14.

FIG. 15 is a flowchart 1500 depicting the operation of equalization logic 1400 of FIG. 14 in accordance with one embodiment. The logic of flowchart 1500 is described here in connection with FIG. 14.

Beginning with step 1505, registers 1410-1413 and 1425 are each set to the middle of their ranges and equalization control word EQ_CNTL[7:0] is set to some desired value. Next, at step 1510, the series pointer (not shown) is set to (000) and pattern-select signal CSEL[3:0] is set to (0001). The series pointer selects the first of six five-bit series to be selected as bits D[4:0] from register 800. Examples of these series are detailed above in connection with Table 1. Setting select signal CSEL[3:0] to (0001) enables saturation counter 1410. The series pointer may encode an offset for the selection of the five-bit series from register 800, treating register 800 like a memory element rather than a shift register. In some embodiments, register 800 could be a bank of random-access memory (RAM).

In step 1515 register 800 captures N data bits, early register 815 captures N−1 early bits, and late register 820 captures N−1 late bits, where N is e.g. ten. Decision 1520 next considers whether the data in register 800 has been compared with all of the data patterns under consideration, four in the present example. As no patterns have yet to be considered, the flow passes to step 1525 in which one of the four selected patterns is loaded into pattern register 810. Recalling that, from step 1510, the series pointer is selecting the first (most recent) five-bit series in register 800, decision 1530 determines whether that five-bit series matches the selected pattern and the registers 815 and 820 are producing just one early or late signal. If not, the process moves to decision 1535 to determine whether all of the five-bit series in register 800 have been considered. In this example in which there are six such series to be considered, decision 1535 increments the series pointer (step 1545) so long as the series pointer is less than (101). If all the series have been considered, however, the process moves to step 1540 to enable the next one of saturation counters 1410-1413 in anticipation of comparing the captured data word to another mask pattern.

Returning to decision 1530 and assuming a match with attending phase error, the process moves to decision 1550. AND gate 830 drives signal UPDN high to increment the enabled one of saturation counters 1410-1413 (step 1555) if signals EARLY and LATE indicate receipt of an early edge; conversely, AND gate 830 drives signal UPDN low to decrement the enabled one of saturation counters 1410-1413 (step 1560) if signals EARLY and LATE indicate receipt of a late edge.

Over time, the state of saturation counters 1410-1413 may match the selected equalization-control word EQ_CNTL[7:0]. Per decision 1565, such a match causes register 1425 to increment the value of signal EQ[3:0] (step 1570). Absent such a match, per decision 1575, the state of the saturation counters is compared with the inverse of the selected equalization-control word EQ_CNTL[7:0], which may be denoted/EQ_CNTL[7:0]. Should such a match occur, register 1425 decrements the value of signal EQ[3:0] (step 1580). If neither of decisions 1565 and 1575 identifies a match the process moves to decision 1535. If a match is noted, however, the resulting increment or decrement is followed by toggling signal CNT RST high then low (step 1585), which returns each of saturation counters 1410-1413 to their midrange value.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted. In any case, whether a given signal is an active low or an active high will be evident to those of skill in the art.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. As examples, 1. Embodiments of the invention may be adapted for use with multi-pulse-amplitude-modulated (multi-PAM) signals; and
2. The feedback methods and circuitry may be adapted for use in other types of equalizers, such as decision-feedback equalizers (DFEs), including partial-response DFEs.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A receiver comprising:
   a receive port to receive an input signal expressing a series of input symbols;
   an equalizer coupled to the receive port to equalize the input signal, responsive to an equalizer control signal, to thereby create an equalized signal expressing a series of equalized symbols;
   a data sampler to produce a series of data samples from the series of equalized symbols;
   a phase detector coupled to the data sampler to issue a phase-error signal responsive to the data samples;
   a mask circuit coupled to the data sampler to assert a match signal responsive to a pattern of the data samples; and
   equalization logic to update the equalizer control signal responsive to the phase-error signal and the match signal.

2. The receiver of claim 1, further comprising an edge sampler to produce a series of edge samples from the series of equalized symbols, the phase detector to issue the phase-error signal responsive to the data samples and the edge samples.

3. The receiver of claim 2, further comprising clock-recovery circuitry coupled to the data sampler and the edge sampler, the clock-recovery circuitry to time the data sampler and the edge sampler responsive to the data samples and the edge samples.

4. The receiver of claim 2, wherein the phase-error signal comprises at least one of an early signal and a late signal.

5. The receiver of claim 1, wherein the mask circuit comprises:
   a pattern register to store the pattern;
   a data register to store the series of data samples; and
   pattern-matching logic coupled to the pattern register and the data register to assert the match signal responsive to a match between the pattern and the data samples.

6. The receiver of claim 1, wherein the pattern of the data samples represents a high-frequency component of the input signal.

7. The receiver of claim 6, the mask circuit to assert the match signal responsive to a second pattern of the data samples.

8. The receiver of claim 7, wherein the second pattern represents a lower-frequency component of the input signal.

9. The receiver of claim 8, wherein the equalization logic adjusts the equalizer control signal responsive to a ratio of errors correlated with the high-frequency component to errors correlated with the lower-frequency component.

10. The receiver of claim 1, further comprising:
a second data sampler to produce a second series of data samples from the series of equalized symbols;
the mask circuit coupled to the second data sampler to assert the match signal responsive to a second pattern of the second data samples.

11. A method comprising:
equalizing an input signal expressing a series of symbols to create an equalized signal, the equalizing responsive to an equalization setting;
sampling the equalized signal to produce a series of data samples;
issuing a phase-error signal responsive to the data samples;
asserting a match signal responsive to a pattern of the data samples; and
adjusting the equalization setting responsive to the phase-error signal and the match signal.

12. The method of claim 11, further comprising sampling the equalized signal to produce a series of edge samples and issuing the phase-error signal responsive to the data samples and the edge samples.

13. The method of claim 12, further comprising sampling the equalized signal responsive to a clock signal and phase adjusting the clock signal responsive to the data samples and the edge samples.

14. The method of claim 12, wherein the phase-error signal comprises at least one of an early signal and a late signal.

15. The method of claim 11, further comprising:
storing a pattern; and
asserting the match signal responsive to a match between the pattern and the data samples.

16. The method of claim 11, wherein the pattern of the data samples represents a high-frequency component of the input signal.

17. The method of claim 16, further comprising asserting the match signal responsive to a second pattern of the data samples.

18. The method of claim 17, wherein the second pattern represents a lower-frequency component of the input signal.

19. The method of claim 18, further comprising adjusting the equalization setting responsive to a ratio of errors correlated with the high-frequency component to errors correlated with the lower-frequency component.

* * * * *